Dec. 28, 1926.
J. H. MUTH
GUIDE BUSHING
Filed Oct. 7, 1924
1,612,205
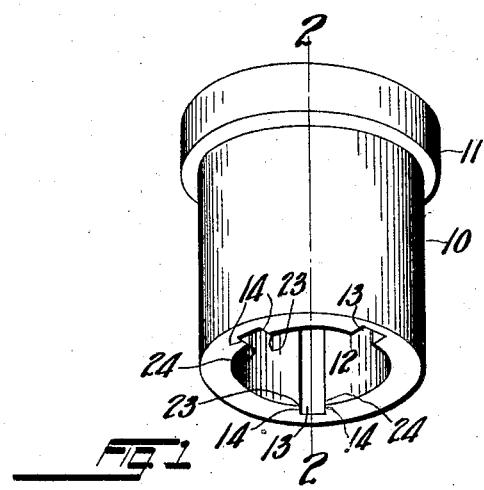
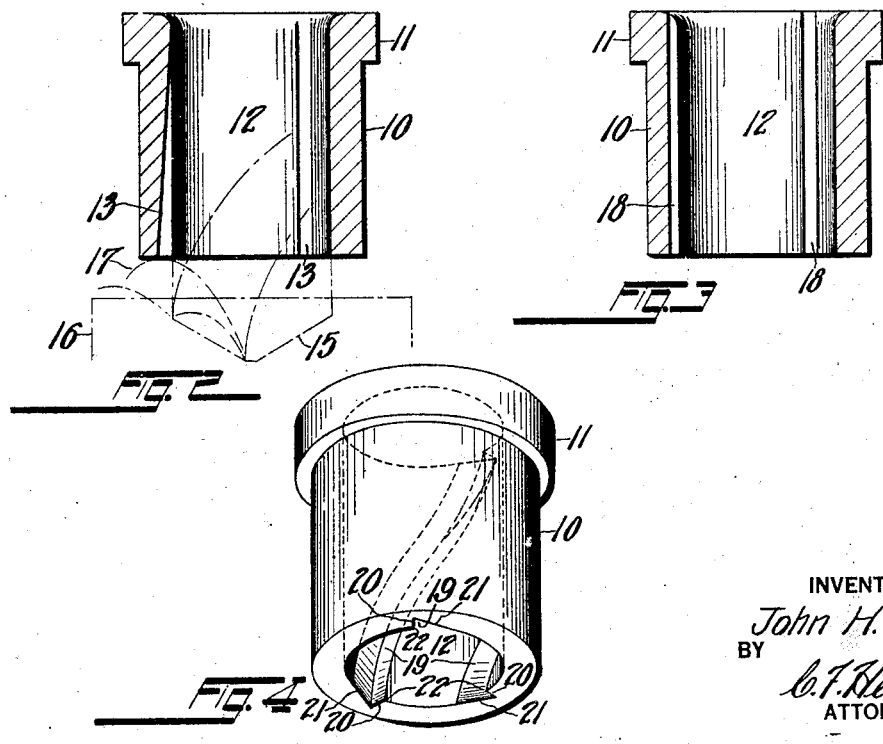
INVENTOR
John H. Muth.
BY
C. F. Heinkel.
ATTORNEY Patented Dec. 28, 1926.

1,612,205

UNITED STATES PATENT OFFICE.

JOHN H. MUTH, OF CLEVELAND, OHIO, ASSIGNOR TO C. F. HEINKEL, OF CLEVELAND, OHIO.

GUIDE BUSHING.

Application filed October 7, 1924. Serial No. 742,099.

My invention relates to guide bushings adapted to guide tools, boring bars, or other apparatus.

One of the objects of my invention is a simple, inexpensive, and efficient guide bushing having means for preventing tools or boring bars or other apparatus guided in this bushing from sticking therein.

Another object is to provide means on such a bushing to break up the chips produced by a cutting tool guided therein.

In guide bushings it is found that a tool or bar operating in this bushing often sticks therein. Two reasons appear why these tools or bars so stick; one of the reasons is that the unequal expansion of the materials of the bushing and of the tool or bar causes a close fitting tool or bar to stick in the bushing; the other reason is that chips get in between the tool or bar and the bushing and causes the former to stick in the latter.

In guide bushings it is also found quite inconvenient to have the chips produced by a twist drill, or other cutting tool, travel lengthwise in the bushing through the flutes of the tool.

The present invention aims to overcome the above disadvantages by providing means to prevent either freezing on, or chip trouble, or both.

One mechanism to attain my aim and objects is illustrated in the accompanying drawing in which—

Fig. 1 is a perspective view of a guide bushing embodying the features of my invention in the form of grooves.

Fig. 2 is a section, taken on a vertical plane indicated by the line 2—2 in Fig. 1, showing three tapered grooves extending all the way through the bushing.

Fig. 3 is a section, similar to Fig. 2, showing three parallel grooves extending all the way through the bushing.

Fig. 4 is a perspective view, similar to Fig. 1, showing three grooves formed spiral longitudinally and triangular cross-sectionally.

Similar reference characters refer to similar parts throughout the views.

The bushing shown in the accompanying drawing comprises the body portion 10, the head portion 11, and the bore 12.

In the present instance, three grooves are provided in the wall of the bore 12, although any other number of grooves may be provided.

As shown in Fig. 2, the grooves 13 may be made taper, being deepest at the bottom of the bushing and tapering to a less depth when they reach the upper end of the bore.

The walls 14 of the grooves form an abutment which is engaged by the chips when they are forced upward by the operation of a tool guided in the bushing and are thereby broken up so that they fall down and do not enter the bore 12 in sufficient quantities to cause trouble.

In Fig. 2 I have shown a portion of a twist drill 15 (in dot and dash lines) in the bushing with the point or cutting end thereof drilling into the block 16 (also in dot and dash lines) and thereby producing the chip 17.

As shown in Fig. 4, the grooves may be made triangular in cross-section, either straight or taper longitudinally, and either straight or spiral.

In such cases each of the grooves 19 comprises the substantially radial wall 20 and the wall 21 substantially tangent to the wall of the bore 12 although it is not necessary that the wall 21 is so tangent. The object of the radial wall is to form a substantial abutment for the chips by one wall of the groove (wall 20) and to form the other wall (wall 21) to lead the chips toward the abutment wall. The wall 21 should not be made sufficiently tangent to rob the wall of the bore 12 of more bearing surface than necessary.

The formation of the grooves 19 provides only one edge 22 while the formation of the grooves 13 and 18 provides two edges 23 and 24. The grooves 19 are better adapted for bushings in which the apparatus rotates in one direction only while the grooves 13 and 18 are better adapted for bushings in which the apparatus rotates in either direction.

When the drill 15 operates as set forth above, the chip 17 is forced upward and, in that movement, strikes or abuts or engages one of the edges or one of the walls of the grooves thereby causing the chip to be broken up and directed upward or to fall down out of the way to prevent the clogging of the drill in the bushing.

When a boring bar or other apparatus is guided in a bushing which has no grooves and fits closely therein, it quite frequently happens that the bar or apparatus freezes on in the bushing due probably to the unequal expansion of the materials of the bushing and of the bar. In such cases the provision of the grooves seems to relieve this freezing on trouble when the grooves extend through at least on one end of the bushing but better results are attained when the grooves extend through both ends of the bushing.

Therefore, the grooves not only provide a means for relieving the chip disadvantages but also the freezing on disadvantages.

It may be well to remark here that, previous to my invention, it was found necessary to provide considerable clearance between a tool or bar and the wall of the bore of a bushing in which the tool or bar is guided to prevent the same from sticking or freezing on in the bushing. In a bar of about three inches in diameter such previous clearance amounted to one quarter of one thousandth of an inch or more whereas, with my invention, such clearance is less than that amount for the same size bar; in fact, in many instances, the clearance required in my invention is not measurable with the usual instruments and is determined by "feel" of these instruments only.

Instead of the taper grooves 13 shown in Fig. 2 I also find that the straight grooves 18 shown in Fig. 3 answer the same purpose. The grooves 18 are better adapted to prevent freezing on while the grooves 13 are better adapted to deflect and dispose of the chips. A judicial application of both of these forms of groove combined in suitable proportions will provide a guide bushing well adapted for many purposes analogous to the above or otherwise.

It is, of course, possible to devise other means on a guide bushing to break up, or deflect, or abut, or engage the chips.

I am aware that modifications may be made other than those shown and described and pointed out, within the scope of the appended claims; therefore, without limiting myself to the precise construction and arrangement of elements shown and described and pointed out,

I claim:—

1. A bushing having a bore defined by a circular portion and a recessedly grooved portion, the circular portion confining a member rotating in the bore, and the grooved portion extending through the ends of the bore to permit of a close fit between the member and the circular portion.

2. A bushing having a bore defined by a circular portion and a recessedly grooved portion, the circular portion confining a member rotating in the bore, the grooved portion extending through the ends of the bore to permit of a close fit between the member and the circular portion, and the grooved portion being open throughout its length.

3. A bushing having a bore defined by a circular portion and a recessedly grooved portion, the circular portion confining a cutting tool rotating in the bore, the grooved portion extending through the ends of the bore to permit of a close fit between the cutting tool and the circular portion, and the grooved portion having a wall to abut chips created by the cutting tool.

4. A bushing having a bore defined by a circular portion and a recessedly grooved portion, the circular portion confining a cutting tool rotating in the bore, the grooved portion extending through the ends of the bore to permit of a close fit between the cutting tool and the circular portion, the grooved portion having a wall to abut chips created by the cutting tool, and the grooved portion being open to permit the passage of chips.

5. A bushing having a bore defined by a circular portion and a recessedly grooved portion, the circular portion confining a cutting tool rotating in the bore, one wall of the grooved portion being radial with the bore, the grooved portion extending through the ends of the bore to permit of a close fit between the cutting tool and the circular portion, and the grooved portion being open throughout its length.

In testimony whereof I affix my signature.

JOHN H. MUTH.